VACUUM COATING CHROMIUM-CHROMIUM OXIDE ON RECORDING MEMBER

Filed Jan. 11, 1967

INVENTORS
JOHN K. ALSTAD
GEOFFREY BATE
RICHARD C. MILLER
JOHN R. MORRISON
DENNIS E. SPELIOTIS

BY

ATTORNEY

United States Patent Office 3,498,837

Patented Mar. 3, 1970

3,498,837

VACUUM COATING CHROMIUM-CHROMIUM OXIDE ON RECORDING MEMBER

John K. Alstad and Geoffrey Bate, Boulder, Colo., Richard C. Miller, Hyde Park, N.Y., and John R. Morrison and Dennis E. Speliotis, Boulder, Colo., assignors to International Business Machines Corporation, Armonk, N.Y., a corporation of New York

Filed Jan. 11, 1967, Ser. No. 608,539
Int. Cl. C23c *13/02;* C22c *39/14*
U.S. Cl. 117—239 4 Claims

ABSTRACT OF THE DISCLOSURE

Wear resistant materials and coatings of vacuum deposited chromium-chromium oxides are prepared by heating a chromium source under "soft" vacuum conditions in an oxygen containing atmosphere of $10^{-3}$ to $10^{-4}$ mm. of Hg to produce a coating having a controlled oxide content that provides unusual wear characteristics. Chromium-chromium oxide materials and wear resistant members coated with chromium-chromium oxide are also disclosed.

BACKGROUND OF THE INVENTION

Field of the invention

The present invention has application to the general field of wear resistant materials and wear resistant coatings produced by vacuum deposition of chromium in a "soft" vacuum including a substantial partial pressure of oxygen. The invention has particular application to the field of producing protected and wear resistant magnetic recording members having such a protectiv material as a coating deposited thereon.

Description of the prior art

One of the greatest problems in utilizing magnetic recording members, of all kinds, is the susceptibility of the magnetic recording media to corrosion, impact and wear. Magnetic recording members are used in various types of magnetic recording systems and find a high degree of use, for example, as storage elements in electronic data processing systems. Storage elements used in electronic data processing systems take many forms, including magnetic tapes, discs, drums, loops, strips, chips, and stripes on paper cards and other flexible substrates. The recording media in such storage elements may be particulate or pleated. "Particulate" systems include, generally, ferromagnetic particles, such as iron oxide, ferritic materials or metal or alloy particles in a suitable binder matrix. A particulate system may be coated upon a supporting layer or cast, without a substrate, into a self-supporting recording member. "Plated" systems are formed by depositing ferromagnetic material by any number of techniques, including electroplating, electroless plating or chemical deposition, vacuum deposition, cathode sputtering, and gas plating or vapor pyrolysis.

During use, these various magnetic recording members are subject to extreme conditions of impact and strain which tend to cause them to wear, sometimes catastrophically. Plated systems have an additional shortcoming in that the plated material has a tendency to corrode.

For example, magnetic tapes and drums utilized in electronic data processing systems pass and repass a magnetic transducer head at high speeds, often on the order of hundreds of inches per second or thousands of revolutions per minute. Systems of this type may be of either the "contact" or "noncontact" variety. In a contact system, the transducer is in substantially continuous and direct contact with the magnetic member, and as would be expected, there is a high degree of frictional wear causing undesirable breakdown of both the transducer and the magnetic recording layer. In a non-contact system, the transducer normally skims a few microns above the magnetic member, supported by a thin film of compressed air. Due to surface irregularities and other causes, there is a distinct tendency for the floating transducer to sink from time to time, with resulting high speed impact of the transducer with the magnetic recording layer. Collisions of this nature cause extereme wear or actual breakdown and destruction of portions of the magnetic media. In a similar manner, the transducer in a contact system may occasionally be thrown out of contact with the magnetic media and recontact the plated magnetic metal in such a manner as to cause extraordinary wear or breakdown and destruction of the magnetic media. Once destruction of a portion of the magnetic recording media is realized, subsequent deterioration of the entire magnetic recording member is often imminent and follows quickly. Extreme wear or slight destruction of the recording media results in permanent loss of data or signal from the effected portion of the recording member. Where the recording member is used in a data processing system, permanent losses of one bit per million bits of information is considered to be intolerable. With the advent of high bit densities of thousands of bits per square inch, the destruction or loss of even a small portion of the recording media may result in a large loss of information.

Recording members in the form of magentic discs may also be utilized in electronic data processing systems. It is not uncommon for magnetic discs in such systems to be stacked, one above the other, and spun at speeds of 1200 to 1800 r.p.m., and greater. Reading of these discs is accomplished by a magnetic transducer head, which, in a non-contact system, is swiftly moving from place to place on a cushion of air above the rapidly spinning disc. It is not uncommon for the transducer to make physical contact with the spinning disc, thus tending to substantially abrade and rupture the magnetic material, or at least to cause the magnetic material to wear excessively. Magnetic discs may also be used in contact systems in which the transducer rides directly upon the disc. This, again, presents a constant problem of frictional wear of the magnetic media and also of high impact destructive recontact when surface irregularities or other causes momentarily throw the transducer out of contact with the disc. In both contact and non-contact disc systems, the smashing of the transducer into the disc can roughen the surface or scrape away the magnetic recording media and abliterate the information recorded thereon.

Similarly, other types of magnetic recording members are subject to shocks, scraping, collisions, and buffeting during their use. Therefore, wear also poses a great threat to them in terms of useful life.

Several approaches have been taken to slove the above-enumerated problems of magnetic recording media wear and destruction. Perhaps the most common method of attempting to avoid magnetic recording media wear and destruction is by the deposition of a protective nonconductive nonmetallic layer or lubricant upon the magnetic recording layer of the recording member to serve as a buffer intermediate the transducer and the magnetic media. Such overlayers must be well adhered to the media or they will only compound the problem. In addition, they must be thin and uniform to avoid excessive transducer-to-media separation which results in signal loss. Another method of protection is the growth, in situ, of a protective oxide layer at the surface of a plated recording member. While the prior art use of protective overlayers is sound in principle, alternative methods are desirable. Alternative means of protection are especially needed in high speed systems in which a large amount of the static electricity is generated. In such high speed systems it is desirable to have overlayers which are conductive in order to dissipate the static charge.

The prior art use of lubricants to minimize the problems due to wear and impact has not been entirely satisfactory. While lubricants do reduce friction, they do not serve to give any substantial protection to the recording media, nor to cushion it from high-speed impacts. Additionally, surface coated lubricants often tend to accumulate dust and loose magnetic material on the tape and, even worse, at the magnetic transducer. Debris collected at the transducer head can, in turn, cause severe damage to the magnetic material in an avalanching effect. Loose debris forms a lubricant-bonded glomerate on the head. This glomerate grows and, in turn, scratches more material from the recording media. Once glomeration begins, the end of useful life of the recording member is near.

Therefore, a material chosen as a coating to impart protection to a magnetic recording member must be hard, and it should be capable of being coated in a thin, uniform, tenaciously adhered layer in combination with the surface it coats. A protective coating which would easily peel or flake under adverse conditions would be of no real protection to magnetic media and, by creating debris, would in fact create new problems. In addition, it is desirable for such material to be corrosion-resistant and conductive.

SUMMARY OF THE INVENTION

To solve the prior art problems as described, the instant invention is directed to a novel technique for vacuum depositing chromium-chromium oxide in the form of a thin, uniform, friction-reducing, corrision-resistant, conductive, protective, hard and highly wear-resistant material. This wear-resistant material may be formed as an overlayer or protective coating upon any object such as, for example, a magnetic recording member.

Generally, a method is provided by which chromium is vacuum deposited under conditions which allow for the formation of chromium compounds during or after deposition. More specifically, novel results are achieved by heating chromium in a "soft" vacuum of about $10^{-3}$ to $10^{-4}$ mm. of Hg in an atmosphere containing oxygen. Alternatively, oxygen-containing atmosphere may be introduced into the vacuum system after deposition is completed in such a manner that the formation of chromium oxides is promoted.

The features and advantages of the invention will be apparent from the following more particular description and specific examples of preferred embodiments of the invention, as illustrated in the accompanying drawings. It will also detail and describe the method utilized in producing the wear-resistant material and of producing magnetic members coated therewith. The following specification also sets forth the new and improved material and protected recording members produced by this invention.

DESCRIPTION OF THE PREFERRED EMBODIMENTS

Procedures and equipment for vacuum deposition are well known to the art. Generally, any suitable source of chromium may be used as a deposition source; however, sintered chromium is preferred. Several techniques may be used to cause evaporation, including resistance heating, electron beam heating, and radio frequency (RF) heating.

In the present state of vacuum deposition technology, it is relatively simple and inexpensive to reach vacuum pressures of $10^{-6}$ mm. of Hg or lower and, normally, vacuum deposition for protective purposes is carried out under these "hard" vacuum conditions. A great deal of caution must be exercised when vacuum depositing at higher pressures. At pressures greater than about $10^{-3}$ mm. of Hg, vacuum deposited metal tends to form a discontinuous powder or dust, rather than a continuous layer. This particle formation is due to collisions of the atoms of the evaporated metal with the residual gas molecules in the vacuum system.

In the method of the present invention, a vacuum pressure of about $10^{-3}$ to about $10^{-4}$ mm. of Hg is preferred, while a vacuum pressure of about $5\times10^{-4}$ mm. of Hg has been found to give excellent results. In a relatively "soft" vacuum of $10^{-3}$ to $10^{-4}$ mm. of Hg, it has been discovered that sufficient oxygen is present to react with the chromium atoms being deposited to form a significant amount of chromium oxide. It is believed to be the presence of these oxides in the final deposited material which imparts improved wear resistance to the material. Naturally, if an atmosphere of pure oxygen is used, rather than air, the desired pressure may be reduced by a factor of about one-fifth. As an alternative method, air or an oxygen-containing atmosphere may be introduced into the vacuum system after deposition is completed; for example, while the vacuum-deposited surface is still hot and/or with electronic biasing to allow for formation of oxides at the surface of the deposited chromium.

Figure 1:
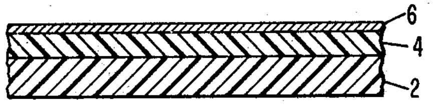
FIGURE 1 is a cross-sectional view of a typical magnetic recording member to which a wear-resistant coating has been applied.

When depositing material in accordance with the teaching of the present invention, thickness is determined to some extent by the use to which the material is to be put. As is usually the case with any material, due to purely mechanical strength and support, the thicker the coating the better are the wear properties it will exhibit. However, in coating magnetic recording media, for example, there are limitations imposed by the ultimate use to which the media is to be put. In FIGURE 1, a magnetic recording member is shown in cross-section. It consists of a substrate 2 on which a magnetic recording media 4 is coated. A wear-resistant coating 6 of chromium-chromium oxide is tenaciously adhered to the recording media. Since loss of recording properties and signal loss increase rapidly with transducer-to-tape separation, if the material is used over magnetic recording media it is necessary to have as thin a coating as possible. A coating of about 5–10 microinches has been found to be sufficient to impart excellent wear properties to a magnetic recording member. In special cases, coatings of less than 5 microinches are feasible and practical.

Figure 2:
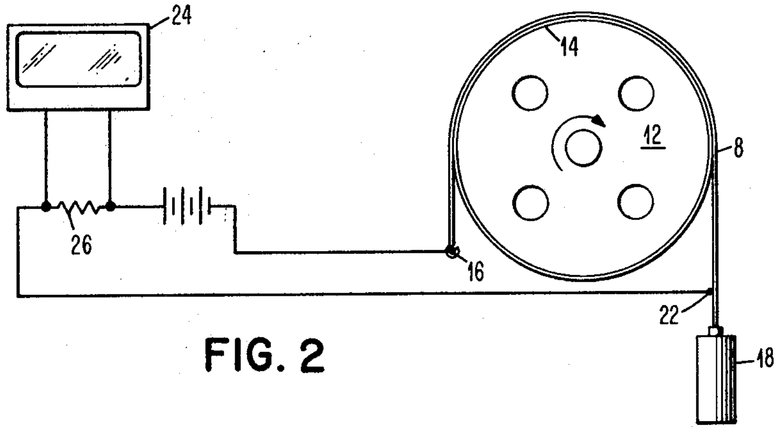
FIGURE 2 is a diagrammatic representation of apparatus utilized in testing the wear properties of the material produced by the subject invention.

In each of the following example, a quantitative wear analysis was made. The apparatus used in making the analysis is set forth schematically at FIGURE 2. A length of material 8 to be tested is placed over wheel 12 around which a layer of abrasive tape 14 has been mounted. The length of to-be-tested material 8 is secured at contact point 16 and laid over the abrasive surface wheel with about 180° of warp. Controlled and constant contact pressure between the to-be-tested material and wheel is maintained by attaching weight 18 to the unsecured end of sample 8. The amount of force in the area of contact between the abrasive wheel and tape is thus accurately controlled. The to-be-tested material 8 is connected on either side of the wheel by contacts 16 and 22 to an $x$–$y$ recorder 24 which samples voltage across a known resistance 26.

In operation, a constant current is applied to the conductive tape surface or protective coating through contacts 16 and 22, and the abrasive wheel is caused to rotate at a constant speed of 1.1 revolution per second by a motor (not shown). As the wear-resistant coating and/or recording media is worn away, the conductive cross section of the material being tested decreases, thus causing the resistance of the tape surface between contact points 16 and 22 to increase. The increased resistance causes the current flowing to fixed resistor 26 to change and register on the *x–y* recorder as a change in voltage. Since the current through the entire system and the resistance of fixed resistor 26 is known, the change in voltage plotted by the *x–y* recorder may be read or correlated as a change in resistance of the material being tested. The change in voltage or resistance is plotted as a function of time. Since the abrasive wheel rotates at a constant speed, time may be correlated with the number of revolutions of the abrasive wheel. With this information, the average thickness of material which is removed by each revolution of the wheel may be calculated.

Figure 3:
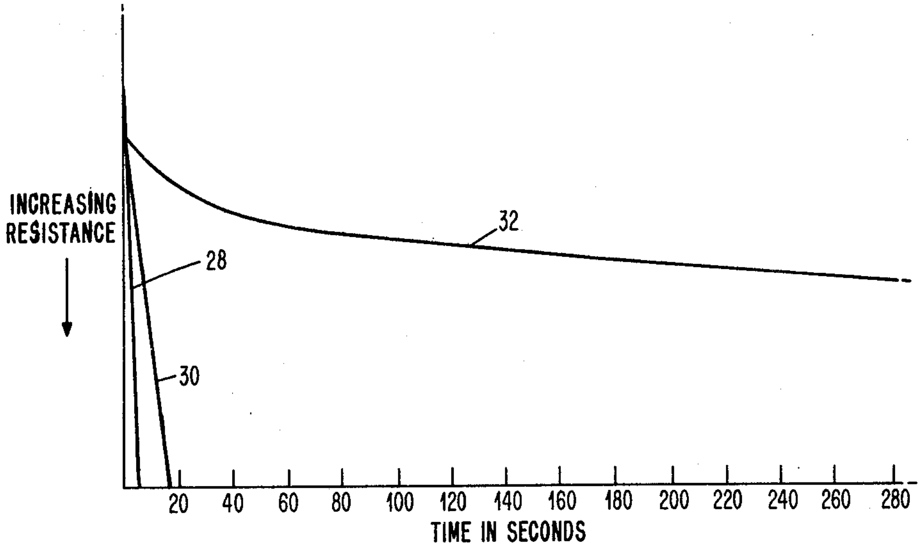
FIGURE 3 is a graphic representation of the comparative wear of material coated in accordance with the subject invention, material coated by chromium under "hard" vacuum conditions, and uncoated material.

FIGURE 3 shows the change in resistance with time for magnetic recording media which are uncoated 28, coated with chromium deposited under hard vacuum conditions 30, and coated in accordance with the teaching of the present invention 32. The slope of the curves are indicative of the wear characteristics of the various tapes. It is clearly seen that uncoated tape is completely destroyed or abraded away in about 7 seconds; tape coated under hard vacuum conditions is destroyed in about 17 seconds; and tape coated in accordance with the present invention is capable of withstanding abrasion for more than 280 seconds without any indication that it is near the end of its useful life. In order to guarantee continuous abrasion of the tape coated in accordance with the present invention, the abrasive material 14 on the wheel 12 was changed approximately every 90 seconds.

In the following example, wear is given in terms of average number of microinches removed by each revolution of the abrasive wheel.

EXAMPLE I

Apparatus similar to that disclosed in U.S. Patents 3,342,632 and 3,342,633, both assigned to the assignee of the subject application, was used in producing the vacuum deposited coating. Sintered chromium was placed in a vessel in a vacuum chamber in which tape was mounted in such a manner that it could be drawn from a supply reel, past a vacuum deposition area, and then onto a take-up reel. The angle of deposition of the chromium was substantially normal to the tape. Under vacuum conditions, the chromium in the vessel is caused to sublime by means of heat supplied by an induction coil. By varying the heat of the induction coil, the rate of sublimation and, therefore, the coating thickness could be controlled. Thickness could also be controlled by regulating the speed of the tape between the supply and the take-up reels.

Before heating of the chromium was begun, the vacuum chamber was evacuated to a hard vacuum of about $10^{-6}$ mm. of Hg. A small amount of air was then allowed to enter the chamber and the vacuum was adjusted to the desired pressure; in this case, $5\times10^{-4}$ mm. of Hg. The thickness of the chromium-chromium oxide wear-resistant material deposited on the tape under these conditions was 5 microinches, as determined by interferometer reading. After deposition was completed, the system was allowed to cool for 30 seconds before air was permitted to enter the vacuum chamber.

Upon testing tape treated in this manner on the abrasive wheel, it was found that it wore at an average rate of approximately 0.0029 microinch per revolution and, as is illustrated in FIGURE 3 by curve 32, was still intact after more than 280 seconds of testing.

EXAMPLE II

Two samples of tape from the same reel as that used in Example I where chromium coated to a thickness of 5 microinches by vacuum deposition under substantially the same conditions as those enumerated in Example I. However, the first sample was coated at a pressure of $5\times10^{-5}$ mm. of Hg., and the second was coated at a pressure of $10^{-6}$ mm. of Hg. When tested on the abrasive wheel, the sample coated at a pressure of $5\times10^{-5}$ mm. of Hg wore at a rate of approximately 1.3 microinches per revolution, while the sample coated at a pressure of $10^{-6}$ mm. of Hg wore at a rate of approximately 1.6 microinches per revolution. The chromium coatings and recording surfaces were completely destroyed in 18 and 16 seconds, respectively. Their average change in resistance as a function of time is illustrated by curve 30 in FIGURE 2.

EXAMPLE III

A length of tape from the same reel as that used in Examples I and II, which had not been coated with any wear-resistant material, was tested on the abrasive wheel. The untreated tape was found to wear at a rate of 2.8 microinches per revolution, or about 1,000 times faster than the sample treated in accordance with the present invention. Its recording surface was completely destroyed in approximately 7 seconds. See FIGURE 3, curve 28.

Comparing Examples I, II and III, it is seen that wear-resistant chromium-chromium oxide prepared in accordance with the subject invention wore approximately 500 times better than pure chromium vacuum-deposited under hard vacuum conditions. It is further seen that a magnetic recording member protected in accordance with the subject invention wore about 1,000 times better than an untreated recording member.

EXAMPLE IV

A sample of magnetic tape was vacuum coated with a chromium-chromium oxide at a pressure of $5\times10^{-4}$ mm. of Hg, and otherwise in accordance with the conditions of Example I. The thickness of the deposited wear-resistant material was 1 microinch, as measured by interferometer reading. When tested on the abrasive wheel, this sample was found to wear at a rate of 0.68 microinch per revolution.

EXAMPLE V

Another sample was coated with chromium-chromium oxide at a vacuum pressure of $5\times10^{-4}$ mm. of Hg, and otherwise in accordance with the parameters of Example I. The thickness of the wear-resistant material, as determined by interferometer reading, was 2 microinches. When tested on the abrasive wheel, the sample was found to wear at a rate of 0.006 microinch per revolution.

Comparing Examples IV and V, it is seen that a 2-microinch thick sample, prepared in accordance with the present invention, wore about 100 times better than a similarly prepared 1 microinch thick sample, and about half as well as the 5-microinch thick sample.

Samples which were plated under similar conditions as those in Example I, but at pressures in a range of about $10^{-3}$ to about $10^{-4}$ mm. of Hg and in a thickness range of 2 to 10 microinches, exhibited wear characteristics on the same order of magnitude as Example I. Samples deposited at pressures greater than $10^{-3}$ mm. of Hg produced powdered layers of discrete particles of metal and metal oxide. Such powdered layers had no value in terms of wear protection.

All of the above samples were prepared on magnetic recording media which consisted of particulate iron oxide in a binder matrix. However, it is clear that the present invention lies in the process of preparing the wear-resistant coating and in the resulting articles or composition. It should not be limited to preparing wear-resistant layers on particulate recording media. It is applicable to preparing, and has in fact been successfully applied to preparing, wear-resistant coatings for plated magnetic recording media. In all cases, a thin, uniform, tenaciously adhered, corrosion-resistant, conductive and wear-resistant coating was formed. The magnetic signal loss for various recording members was only about 10% with a coating of 5 microinches thick and less for thinner coatings.

It is apparent that the subject invention sets forth a new method for making a new, highly wear-resistant material. While it has been amply illustrated that this material may be used as a protective coating for recording media, it is equally clear that it may be used wherever protective coatings are needed and that, in some instances, it may be used as an independent wear-resistant element; for example, as a foil, not as a coating.

What is claimed is:

1. A process of producing a wear-resistant magnetic recording member coated with chromium-chromium oxide, including the steps of:
   - placing chromium metal in a vacuum chamber;
   - placing a magnetic recording member in said vacuum chamber;
   - adjusting the pressure within the chamber within the range of about $10^{-3}$ mm. of Hg to about $10^{-4}$ mm. of Hg, including a partial pressure of oxygen;
   - heating the chromium to a temperature at which it sublimes; and
   - coating the resulting chromium-chromium oxide on the surface of the magnetic recording member.

2. The process of claim 1 in which the pressure in the vacuum chamber is $5 \times 10^{-4}$ mm. of Hg.

3. The process of claim 1 in which the coated chromium-chromium oxide is 2 microinches to 10 microinches thick.

4. A wear resistant magnetic recording member coated with chromium-chromium oxide produced by the process of claim 1.

References Cited

UNITED STATES PATENTS

| | | | |
|---|---|---|---|
| 2,812,270 | 11/1957 | Alexander | 117—50 |
| 3,109,749 | 11/1963 | Ricco | 117—239 |
| 3,345,202 | 10/1967 | Kiss et al. | 117—107 X |
| 3,353,895 | 11/1967 | Emerson | 117—107 X |

OTHER REFERENCES

Holland: "Vacuum Deposition of Thin Films," 1956, pages 16 to 21, 105, 106, 177 and 178 relied upon.

ANDREW G. GOLIAN, Primary Examiner

U.S. Cl. X.R.

117—107, 234, 240